United States Patent
Meyer et al.

(10) Patent No.: US 8,783,667 B2
(45) Date of Patent: Jul. 22, 2014

(54) AXIALLY DAMPING HYDRAULIC MOUNT

(75) Inventors: Heinrich Meyer, Königswinter (DE); Detlev Hagedorn, Ingolstadt-Gerolfing (DE); Stefan Vollmann, Ingolstadt-Gerolfing (DE)

(73) Assignees: ZF Friedrichshafen AG, Friedrichshafen (DE); Audi AG, Ingolstadt (DE)

( * ) Notice: Subject to any disclaimer, the term of this patent is extended or adjusted under 35 U.S.C. 154(b) by 97 days.

(21) Appl. No.: 13/133,965

(22) PCT Filed: Dec. 1, 2009

(86) PCT No.: PCT/DE2009/050067
§ 371 (c)(1),
(2), (4) Date: Aug. 11, 2011

(87) PCT Pub. No.: WO2010/066249
PCT Pub. Date: Jun. 17, 2010

(65) Prior Publication Data
US 2011/0291336 A1 Dec. 1, 2011

(30) Foreign Application Priority Data

Dec. 11, 2008 (DE) .......................... 10 2008 054 528

(51) Int. Cl.
*F16F 13/18* (2006.01)

(52) U.S. Cl.
USPC .................................................. 267/140.13

(58) Field of Classification Search
USPC .......................... 267/219, 35, 141.11, 141.13
See application file for complete search history.

(56) References Cited

U.S. PATENT DOCUMENTS

| 4,739,962 | A |   | 4/1988 | Morita et al. |
| 4,753,422 | A | * | 6/1988 | Thorn ....................... 267/140.13 |
| 4,809,959 | A | * | 3/1989 | Hourlier .................. 267/140.13 |
| 4,925,162 | A | * | 5/1990 | Kojima .................... 267/140.13 |

(Continued)

FOREIGN PATENT DOCUMENTS

| DE | 3937232 | 11/1989 |
| DE | 4121939 | 1/1993 |

(Continued)

OTHER PUBLICATIONS

International Search Report dated Apr. 23, 2010.

(Continued)

*Primary Examiner* — Anna Momper
(74) *Attorney, Agent, or Firm* — Cohen & Hildebrand, PLLC

(57) ABSTRACT

Axially damping hydraulic mount is provided, relating to elastomer mounts for engine mounts for damping the vibrations transmitted from internal combustion engine to the body and for acoustic decoupling. The hydraulic mount includes a frustoconical elastomer support spring, between mount core and upper part of outer jacket, with a working chamber and a compensating chamber for fluid damping medium. Chambers are separated from one another by a separator extending transversely to the mount axis and includes a coupling diaphragm, wherein the working chamber is enclosed by support spring and separating element. Compensating chamber is enclosed by separating element and elastomer bellows. A duct on the separating element is enclosed by a duct part. To counteract excessive increase in dynamic spring rate when frequencies of axially acting vibrations are present, the duct part is occupied by an additional mass. Then the duct part is rigidly connected to a mass element.

5 Claims, 1 Drawing Sheet

(56) References Cited

U.S. PATENT DOCUMENTS

| | | |
|---|---|---|
| 5,104,100 A | 4/1992 | Simuttis |
| 5,386,973 A * | 2/1995 | Brenner et al. .......... 267/140.13 |
| 5,443,245 A | 8/1995 | Bellamy et al. |
| 6,536,113 B2 * | 3/2003 | Guillemot ................. 29/896.93 |
| 6,676,117 B2 * | 1/2004 | Desmoulins et al. .... 267/140.13 |
| 6,793,206 B2 * | 9/2004 | Reh et al. ................. 267/140.13 |
| 6,880,483 B2 * | 4/2005 | Fedders ....................... 114/363 |
| 2002/0043748 A1 | 4/2002 | Meyer |

FOREIGN PATENT DOCUMENTS

| | | |
|---|---|---|
| DE | 69308268 | 10/1997 |
| DE | 19843558 | 9/1998 |
| EP | 1584837 A1 | 10/2005 |
| FR | 2559864 A1 | 8/1985 |
| GB | 2165617 A | 4/1986 |
| JP | 08270717 A | 10/1996 |
| JP | 2007120597 | 5/2007 |

OTHER PUBLICATIONS

Search Report of the corresponding German patent application, 10 2008 054 528.7, dated Feb. 26, 2014.

* cited by examiner

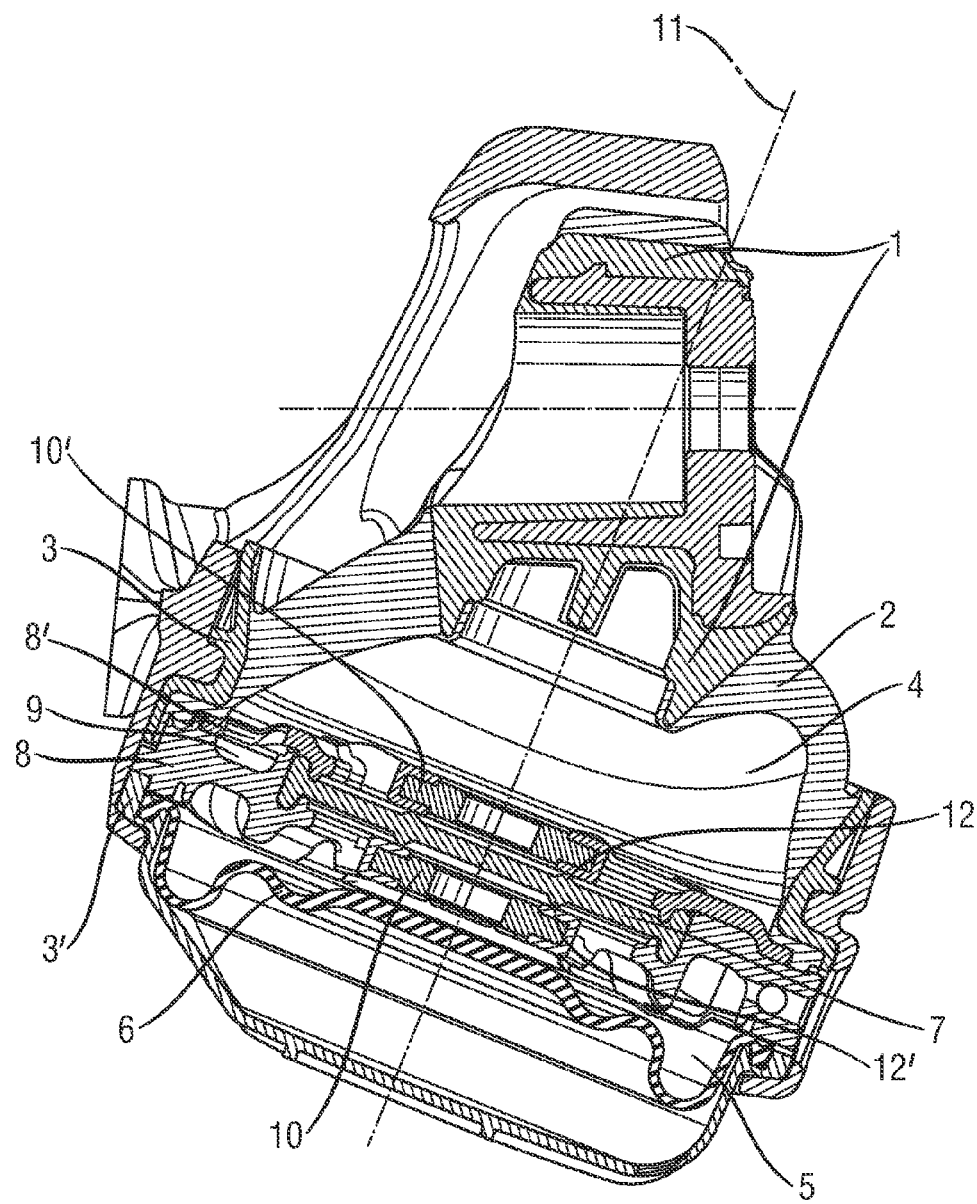

AXIALLY DAMPING HYDRAULIC MOUNT

This is an application filed under 35 USC §371 of PCT/DE2009/050067, filed on Dec. 1, 2009, claiming priority to DE 10 2008 054 528.7 filed on Dec. 11, 2008.

BACKGROUND OF THE INVENTION (1) Field of the Invention

The invention relates to an axially damping hydraulic mount. The invention relates to elastomer mounts with hydraulic damping of the type used for example in automotive engineering as engine or equipment mounts for damping the vibrations transmitted from the internal combustion engine to the body and for acoustic decoupling.

(2) Description of Related Art

Engine mounts and equipment mounts, respectively, are constructed essentially of a metallic mount core by which the mount is typically also attached on the engine or the equipment, of a mostly two-part outer jacket and a frustoconical elastomer support spring arranged between the mount core and an upper part of the outer jacket. Depending on the configuration, the aforementioned parts are further received by a housing with which the parts of the outer jacket of the mount are frequently held together. If the mount is provided with hydraulic damping, then the aforementioned elastomer support spring surrounds a working chamber receiving a fluid damping means. This working chamber is separated from an equalizing chamber by a separating element, namely a membrane, a so-called nozzle plate and the like, which extends transversely to the mount axis. The equalizing chamber is surrounded by an elastomer bellow which is typically protected by a lower part of the outer jacket. In the region of the separating element which separates the working chamber and the equalizing chamber, the working chamber and the equalizing chamber are connected with each other by a duct, which allows damping means to pass between the working chamber and the equalizing chamber. If vibrations act axially on the mount, the damping means can then move out of the working chamber into the equalizing chamber during deflection and move back from the equalizing chamber into the working chamber during rebound. The back and forth oscillation of the fluidic damping means provides additional damping for axially acting vibrations.

In the design of the engine mounts, it is particular difficulty to design the engine mounts so as to provide effective acoustic decoupling between the engine and the body, which would prevent noise generated by high-frequency vibrations of the engine to be transferred to the body. In particular, the large number of parts of which the mount is constructed produces problematic partial resonances at different locations of the mount, which may also mutually influence each other at least partially. In particular at higher frequencies, such partial resonances cause an undesired enhancement of the dynamic spring rate of the mount and hence lead to a deterioration of the acoustic decoupling. The quality of the noise insulation of the engine mount is hereby frequency-dependent. However, it is quite difficult to identify the individual partial resonances and the respective locations where they occur and to reduce occurrences of these resonances while maintaining all other properties required from the mount, such as damping, idling decoupling and spring rate ratios in the different spatial directions.

BRIEF SUMMARY OF THE INVENTION

It is an object of the invention to provide a solution with a generic mount, i.e., an axially damping hydraulic mount, which substantially prevents or at least significantly reduces the dynamic enhancement of the spring rate. To this end, the mount should be designed to improve acoustic decoupling in its intended application by reducing the partial resonances in the mount while maintaining its other required damping properties.

The object is attained with an axially damping hydraulic mount having the features of the independent claim. Advantageous embodiments or improvements of the invention are recited in the dependent claims. The axially damping hydraulic mount proposed for attaining the object is composed, as generally known, of a frustoconical elastomer support spring disposed between a bearing core and an upper part of an outer jacket and has two chambers, namely a working chamber and an equalizing chamber, for receiving a fluid damping means. The two chambers are arranged on top of one another in the axial direction of the mount and separated from each other by a separating element having a coupling membrane and extending transversely to the mount axis. The working chamber is hereby enclosed by the elastomer support spring and the separating element, whereas the equalizing chamber disposed on the other side of the separating element is enclosed by an elastomer bellow in addition to the separating element, wherein the elastomer bellow is protected by a lower part of the outer jacket. A duct which is enclosed by at least one duct part is formed on the separating element, wherein the at least one duct part is substantially rigid, but still has a small elastic yieldability. The at least one duct part is capable of oscillating due to the yieldability and the arrangement on the decoupling membrane of the separating element, so that characteristic component resonances with frequencies in the audible range may be generated on the duct part and in cooperation with the other mount components when the bearing is loaded.

To counteract the then occurring enhancement of the dynamic spring rate in the presence of corresponding frequencies from axially acting oscillations, an additional mass is applied according to the invention to the at least one duct part. The duct part is hereby rigidly connected with at least one additionally arranged mass element, which causes detuning of the component resonance, thereby moving the component resonance to frequencies outside the audible range.

With the selected approach of applying a mass to the duct part(s), detuning of the fundamental component resonance is achieved, without affecting other properties of the mount, such as its damping and idling decoupling. Because a significant effect can be achieved with relatively small additional masses, the proposed measure of the invention adds very little additional weight to the mount which is preferably made from light-weight materials. In addition, the resonance characteristic can be individually tuned during manufacture of the mount by a variable arrangement and sizing of the mass of the additional mass element(s).

In a practical embodiment of the hydraulic mount according to the invention, the duct is enclosed by two duct parts forming the duct. The duct consists of a duct disk and a duct cover disk and is formed radially along the outside periphery of the decoupling membrane. According to the core idea of the invention, one or more mass elements are arranged on the duct disk and/or on the duct cover disk or are connected with these duct parts. In one possible embodiment of a mount with a duct formed by two duct parts, a mass element which is rigidly connected with the duct disk is arranged below the decoupling membrane and a mass element which is rigidly connected with the duct cover disk is arranged above the decoupling membrane. In this embodiment, both mass elements preferably bear tightly against the decoupling membrane. In this way, the mount produces damping also for small vibration amplitudes, preventing, for example, the so-called micro-shaking when applied as engine mount.

The additional mass element(s) can be inserted in the mount of the invention or connected with its parts in different ways. According to one contemplated embodiment, the additional mass element(s) is/are clipped on the duct part(s). In a particularly preferred embodiment, where the duct parts are made from a plastic material, the additional mass element(s) is/are formed from insertion parts made from untreated steel which are overmolded with the plastic material of the duct part(s).

Depending on the application, the mount can be constructed to have switchable damping. The otherwise unobstructed play of the decoupling membrane and hence its yieldability can then be limited by employing a switching magnet. A mount installed in a motor vehicle can then be operated such that the separating element, or the decoupling membrane, disposed between the chambers has unobstructed play when the engine idles and thus does not contribute to damping, while providing a damping effect during driving. In such switchable embodiment of the hydraulic mount of the invention, the switching magnet forms an additional mass element within the context of the invention. Aspects of the invention will now be described again below with reference to an exemplary embodiment.

BRIEF DESCRIPTION OF THE DRAWINGS

The associated FIG. 1 shows an embodiment of the mount of the invention in a partial cross-sectional view.

DETAILED DESCRIPTION OF THE INVENTION

The mount includes a mount core 1, a two-part outer jacket 3, 3' and an elastomer support spring 2 which is arranged between the Mount core 1 and the upper part 3 of the outer jacket 3, 3' and has, as indicated in the Figure, a frustoconical shape. The mount core 1 which is simultaneously used for attaching the mount at the installation site is supported against the upper part 3 of the outer jacket 3, 3' by the support spring 2. The support spring 2 surrounds the working chamber 4 constructed for receiving, a fluid damping, means, The working chamber 4 is spatially separated from the equalization chamber 5 located underneath in the axial direction by a separating element: 7, 8, 8'. The separating element dividing the chambers consists of a separating membrane 7 which is clamped in its radially outer region transversely to the mount axis 11 between a duct disk 8 and a duct cover disk 8'. The duct 9 extending circumferentially along the mount periphery is enclosed by the duct disk 8 and the duct cover disk 8'. The duct 9 allows damping means to pass between the working chamber 4 and the equalizing chamber 5. The bottom side of the equalizing chamber is surrounded by an elastomer bellow 6, which is surrounded by a lower part 3' of the outer jacket 3, 3' for mechanical protection.

In the illustrated exemplary embodiment, the duct parts (duct disk 8 and duct cover disk 8') forming the duct 9 are made of a plastic material. Rigidly connected therewith are the additional mass elements 10, 10' provided by the invention, which are made from untreated steel overmolded with the plastic material of the duct pans. The mass elements 10, 10' bear tightly against beads 12 above and below the separating membrane 7. The entire mount is received by a housing, which also connects and clamps the parts of the outer jacket 3, 3' to each other and to the duct parts.

LIST OF REFERENCES SYMBOLS

1 Mount core
2 (Elastomer) support spring
3 Upper part of the outer jacket
3' Lower part of the outer jacket
4 Working chamber
5 Equalizing chamber
6 Bellow
7 Decoupling membrane
8 Duct part, duct disk
8' Duct part, duct cover disk
9 Duct
10 Mass element
10' Mass element
11 Mount axis
12 Bead
12' Bead

The invention claimed is:

1. An axially damping hydraulic mount comprising:
a frustoconical elastomer support spring arranged between a mount core and an upper part of an outer jacket,
a working chamber for receiving a fluid damping means and an equalizing chamber enclosed by an elastomer bellow, protected by a lower part of the outer jacket,
the equalizing chamber is separated from the working chamber by a separating element including a yielding and non-perforated separating membrane extending transversely with respect to a longitudinal axis, the separating membrane having an upper surface and a lower surface, a plurality of beads disposed on each of the upper surface and the lower surface of the separating membrane,
a duct enclosed by at least one duct part is formed on the separating element, with the duct enabling transfer of damping means between the working chamber and the equalizing chamber, and
wherein at least one mass element is applied to the at least one duct part including a duct disk cover and a duct cover disk, wherein the at least one duct part is rigidly connected to the at least one mass element, wherein the at least one mass element bears against the plural beads disposed on each of the upper surface and the lower surface of the separating membrane,
wherein the liquid in the working chamber does not contact the separating membrane,
wherein an outside periphery of the separating membrane is disposed between the duct disk and the duct cover disk.

2. The axially damping hydraulic mount according to claim 1,
wherein the first mass element is clipped onto the duct disk.

3. The axially damping hydraulic mount according to claim 1, wherein the at least one duct part is made of plastic, and wherein the at least one mass element is formed as insertion parts made from untreated steel, which are overmolded with plastic of the at least one duct part.

4. An axially damping hydraulic mount, comprising
a duct constructed from two duct parts, including a duct disk and a duct cover disk,
the duct radially surrounds an outside periphery of a yielding and non-perforated separating membrane, wherein the separating membrane has an upper surface and a lower surface with a plurality of heads disposed on each of the upper and lower surfaces,
wherein the separating membrane is disposed between the duct disk and the duct cover disk,
a first mass clement is rigidly connected with the duct disk and is arranged below the separating membrane and a second mass element which is rigidly connected with the duct cover disk and is arranged above the separating membrane, wherein both mass elements are in physical contact with the plurality of beads disposed on each of the upper and lower surfaces of the separating membrane, wherein the second mass element is clipped onto the duct cover disk.

5. The axially damping hydraulic mount according to claim 4, wherein the duct parts are made of plastic, and wherein the mass elements are formed as insertion parts made from untreated steel, which are overmolded with the plastic, of the duct parts.

* * * * *